US011488182B2

(12) United States Patent
Holman et al.

(10) Patent No.: US 11,488,182 B2
(45) Date of Patent: Nov. 1, 2022

(54) SYSTEM AND METHOD FOR IDENTIFYING CONTENT IN A WEB-BASED MARKETING ENVIRONMENT

(71) Applicant: OBSERVA, INC., Seattle, WA (US)

(72) Inventors: Hugh Howard Holman, Seattle, WA (US); Erik Eugene Chelstad, Seattle, WA (US)

(73) Assignee: Observa, Inc., Seattle, WA (US)

( * ) Notice: Subject to any disclaimer, the term of this patent is extended or adjusted under 35 U.S.C. 154(b) by 134 days.

(21) Appl. No.: 16/446,988

(22) Filed: Jun. 20, 2019

(65) Prior Publication Data
US 2019/0392459 A1 Dec. 26, 2019

Related U.S. Application Data

(60) Provisional application No. 62/688,725, filed on Jun. 22, 2018.

(51) Int. Cl.
G06Q 30/00 (2012.01)
G06Q 30/02 (2012.01)
G06F 16/953 (2019.01)
G06F 16/951 (2019.01)
G06F 16/13 (2019.01)

(52) U.S. Cl.
CPC ....... *G06Q 30/0201* (2013.01); *G06F 16/137* (2019.01); *G06F 16/951* (2019.01); *G06F 16/953* (2019.01); *G06Q 30/0273* (2013.01); *G06Q 30/0272* (2013.01)

(58) Field of Classification Search
None
See application file for complete search history.

(56) References Cited

U.S. PATENT DOCUMENTS 6,026,387 A 2/2000 Kesel
6,633,851 B1 10/2003 Engler et al.
(Continued)

OTHER PUBLICATIONS

Mograbi-Lapiner et al. U.S. Appl. No. 62/480,479, filed Apr. 2, 2017 (Year: 2017).*

(Continued)

*Primary Examiner* — Naresh Vig
(74) *Attorney, Agent, or Firm* — FisherBroyles LLP; Kevin D. Jablonski

(57) ABSTRACT

An observation platform for coordinators, marketers, advertisers, merchants, retailers, and users to establish, utilize and fulfill an observation campaign suited to verify digital-world implementations surrounding observable, standards, objectives, conditions, rules, guidelines, and/or restrictions for media presentations. The observable data points may be part of an overall strategy in a digital observation campaign established by an observation campaign coordinator. One aspect of this method is determining, with some certainly, that an observed advertisement originated from an advertising campaign. Thus, the advertising observation platform is capable of surveying several media files (e.g., image files, sound files, video files) that are presented as ads within the context of web pages served to browsers of Internet content. A hashing function may be used on all observed content and all served media files to determine with some certainty that the displayed ad originated from one or more advertising campaigns.

21 Claims, 8 Drawing Sheets

(56) References Cited

U.S. PATENT DOCUMENTS

| | | | |
|---|---|---|---|
| 3,064,896 | A1 | 11/2011 | Bell et al. |
| 8,666,807 | B1 | 3/2014 | Murray et al. |
| 9,361,353 | B1 | 6/2016 | Aristides |
| 9,508,082 | B1 | 11/2016 | Mannix et al. |
| 2003/0009373 | A1 | 1/2003 | Ensing et al. |
| 2004/0034684 | A1 | 2/2004 | Payne |
| 2004/0220975 | A1* | 11/2004 | Carpentier ............ G06F 16/137 |
| 2005/0149382 | A1 | 7/2005 | Fenner et al. |
| 2006/0167971 | A1 | 7/2006 | Breiner |
| 2007/0288951 | A1* | 12/2007 | Ray ........................ H04H 60/37 725/23 |
| 2008/0040216 | A1 | 2/2008 | Dellovo |
| 2008/0183552 | A1 | 7/2008 | O'Hagan |
| 2009/0063306 | A1 | 3/2009 | Fano et al. |
| 2009/0204471 | A1 | 8/2009 | Elenbaas et al. |
| 2009/0240516 | A1 | 9/2009 | Palestrant |
| 2010/0171826 | A1 | 7/2010 | Hamilton et al. |
| 2010/0218108 | A1 | 8/2010 | Crabtree et al. |
| 2011/0029365 | A1 | 2/2011 | Alhadeff et al. |
| 2011/0212717 | A1 | 9/2011 | Rhoads et al. |
| 2012/0029978 | A1 | 2/2012 | Olding et al. |
| 2012/0047008 | A1 | 2/2012 | Alhadeff et al. |
| 2012/0265574 | A1 | 10/2012 | Olding et al. |
| 2013/0018957 | A1 | 1/2013 | Parnaby et al. |
| 2013/0079128 | A1 | 3/2013 | Thomas et al. |
| 2013/0132170 | A1 | 5/2013 | Yelisetti et al. |
| 2013/0132987 | A1 | 5/2013 | Narasimhan et al. |
| 2013/0203433 | A1 | 8/2013 | Luna et al. |
| 2013/0204652 | A1 | 8/2013 | Marins et al. |
| 2013/0282446 | A1 | 10/2013 | Dobell |
| 2014/0074591 | A1 | 3/2014 | Allen et al. |
| 2014/0173285 | A1 | 6/2014 | Manchala |
| 2014/0180772 | A1 | 6/2014 | Tutupata et al. |
| 2014/0193027 | A1* | 7/2014 | Scherf ................... G06F 16/783 382/100 |
| 2014/0249889 | A1 | 9/2014 | Park et al. |
| 2014/0278850 | A1 | 9/2014 | Boccuzzi, Jr. et al. |
| 2014/0324555 | A1 | 10/2014 | Wu et al. |
| 2014/0343984 | A1 | 11/2014 | Shahabi et al. |
| 2014/0379399 | A1 | 12/2014 | Brydon et al. |
| 2015/0019307 | A1* | 1/2015 | Girard ................ G06Q 30/0267 705/14.12 |
| 2015/0032533 | A1 | 1/2015 | Raab et al. |
| 2015/0178742 | A1 | 6/2015 | Smith et al. |
| 2015/0205760 | A1 | 7/2015 | Hershey et al. |
| 2015/0213315 | A1 | 7/2015 | Gross |
| 2015/0254593 | A1 | 9/2015 | Rinze et al. |
| 2015/0347520 | A1 | 12/2015 | King et al. |
| 2015/0356489 | A1 | 12/2015 | Kazai et al. |
| 2016/0027051 | A1 | 1/2016 | Gross |
| 2016/0078499 | A1 | 3/2016 | Brown et al. |
| 2016/0110775 | A1 | 4/2016 | Moiz et al. |
| 2016/0148232 | A1* | 5/2016 | Besehanic .......... G06Q 30/0204 705/7.33 |
| 2016/0148245 | A1* | 5/2016 | Celis ................. G06Q 30/0241 705/14.11 |
| 2016/0180365 | A1 | 6/2016 | Shi et al. |
| 2016/0253710 | A1 | 9/2016 | Publicover et al. |
| 2016/0350697 | A1 | 12/2016 | Gruen |
| 2017/0032586 | A1 | 2/2017 | Cheatham, III et al. |
| 2017/0053330 | A1 | 2/2017 | Smith et al. |
| 2017/0098197 | A1 | 4/2017 | Yu et al. |
| 2017/0221156 | A1 | 8/2017 | Mingarelli et al. |
| 2017/0249574 | A1 | 8/2017 | Knijnik et al. |
| 2017/0331877 | A1 | 11/2017 | Balasubramanian et al. |
| 2018/0293616 | A1 | 10/2018 | Greenhood |
| 2018/0295548 | A1 | 10/2018 | Kumar et al. |
| 2019/0377572 | A1* | 12/2019 | Mograbi-Lapiner ... G06F 21/10 |
| 2022/0083995 | A1 | 3/2022 | Flowers et al. |

OTHER PUBLICATIONS

Kumar et al., Significance of Hash Value Generation in Digital Forensic, Jul. 2012, International Journal of Engineering Research and Development, vol. 2, Issue 5, pp. 64-70 (Year: 2012).*

What is Metadata, May 2, 2016, Harvard Law School, printed through www.archive.org (date is in the URL in YYYYMMDD format) (Year: 2016).*

Davis et al., Mobile Media Metadata for Mobile Imaging, 2000, IEEE International Conference on Multimedia and Expo (ICME), pp. 1701-1710. (Year: 2004).*

Koenig et al., Forensic Authentication of Digital Audio and Video Files, 2015, John Wiley & Sons, Handbook of Digital Forensics of Multimedia Data and Devices, First Edition, pp. 133-181 (Year: 2015).*

"Crowdforge: Crowdsourcing complex work", A.Kittur, B. Smus, S. Khamkar, RE Kraut—Proceedings of the 24th annuity . . . , 2011—dl.acm.org (Year: 2011).

"Quality control in crowdsourcing systems: Issues and directions" M. Allahbakhsh, B. Benatallah, A. Ignjatovic—IEEE Internet . . . , 2013—ieeexplore.ieee.org (Year: 2013).

Morse, David; "MINISIZE2: A computer program for determining effect size and minimum sample size for statistical significance for univariate, multivariate, and nonparametric tests", Educational and Psychological Measurement; 1999—journals.sagepub.com (Year: 1999).

http://web.archive.org/web/20150226150240/http://www.gigwalk.com/crowdsourcing (Year: 2015).

http://web.archive.org/web/20150223140532/http://www.gigwalk.com/case-study/Gigwalk_mobileretail_whitesheet.html (Year: 2015).

Position validation in crowdsourced accessibility mapping; RM Rice, AO Aburizaiza, MT Rice . . . - . . . : The International Journal . . . , 2016—utpjournals.press (Year: 2016).

The motivations and experiences of the on-demand mobile workforce; R. Teodoro, P. Ozturk, M. Naaman, W. Mason . . . —Proceedings of the 17th . . . , 2014—dl.acm.org (Year: 2014).

"Applying the service profit chain in a retail environment: Challenging the Satisfaction mirror", R. Silvestro, S. Cross—International Jounral of Service Industry . . . , 2000—emeraldinsignt.com (Year: 2000).

"Applying the service profit chain to analyse retail performance: the case of the managerial strait-jacket?" M. Pritchard, R. Silvestro—International Journal of Service . . . , 2005—emeraldinsight.com (Year: 2015).

Harvard Law School; "What is Metada?" The Wayback Machine—https://web.archive.org/web/20160522163145/http://hsl.harvard.edu/dept.its/what-is-metadata/; pp. 1-2; (Year: 2021).

Transferring Knowledge from a Crowd to a Retail Company—A case study of Roamier Sweden S. Gistera, M. Carlander—2015—diva-portal.org (2015).

"A Conceptual Model for Mystery Shopping Motivations", P. Allison, D. Severt, D. Dickson—Journal of Hospitality Marketing & . . . , 2010—Taylor & Francis (2010).

Exploring the Consequences of Shopper-Facing Technologies: Their Effect on Shopper Experiences and Shopping Outcomes; BI Spaid—2014—trace.tennessee.edu (2014).

International Search Report and Written Opinion dated Jan. 30, 2018 for PCT/US17/062829 filed Nov. 21, 2017.

International Search Report and Written Opinion dated Mar. 8, 2018; for PCT/US17/062816 filed Nov. 21, 2017.

Grocery & Retail News "Get Paid for Snooping on Your Supermarket," <URL: http://couponsin the news.com/2016/05/16/get-paid-for-snooping-on-yoursupermarket/>.

J. Dawes, B. Sharp—Australian Jornal of Market Research, 2000—reearchgate.net (2000) "The reliability and validity of objective measures of customer service; mystery shopping".

W. Hensens—Journal of Tourism Futures, 2015—The future of hotel rating; emeraldinsight.com (2015).

\* cited by examiner

| CAMPAIGN 300 | Total Cost Outlay 310 |
| --- | --- |
| | Cost per Observation 311 |
| | Total Number of Observations 312 |
| | Time Frame 313 |
| | Geographic Limitations 314 |
| | Diminishing Cost per Observation 315 |
| | Observer Reputation Limitations 316 |
| | Variable Cost Per Transaction 317 |
| | Failure Parameters 318 |
| | Quality Parameters 319 |
| | Opportunity/Acceptance Lockout 320 |
| | Observation Success Termination 321 |
| | Demographics 322 |
| | Past Behavior 323 |

FIG. 3

SYSTEM AND METHOD FOR IDENTIFYING CONTENT IN A WEB-BASED MARKETING ENVIRONMENT

PRIORITY CLAIM

This application claims the benefit of U.S. Provisional Application No. 62/688,725, entitled "System and Method for Identifying Content in a Web-Based Marketing Environment" filed Jun. 22, 2018, which is incorporated by reference in its entirety herein for all purposes.

BACKGROUND

Individuals and businesses often desire to collect data about various situations that exist in the real-world, even when that data exists in a virtual setting being presented on a computer. For example, a manufacturer of a product may wish to collect data about how, when and to whom, the product is being displayed at various digital or online locations. Because digital presentation is personalized to each individual, individuals and enterprises, and government and non-governmental agencies, often do not have the ability to see what is actually presented to the individual. This problem is compounded in the digital universe by the infinite scale of personalization and ability for dynamic presentation of information as components of the user experience. This challenge becomes amplified as the time window for the information collection becomes more specific and/or the digital locations from which the information is to be collected grow in number. For example, merchants advertising their products or services for sale, whether manufacturers, wholesalers, brokers, or the like, may need to determine if, when, how much, in what way or condition, or at what price their goods and advertisements are being put in front of consumers as well as what information is being delivered or what other products are being promoted along with their own. Another example might be a digital property or business owner that contracts for a periodic service about which they would like to validate the quality and completeness of content and digital presentation delivery. In short, the condition of computer content and various observable conditions at the time of presentation is desirable data to observe, obtain, and document.

Individuals and businesses wishing to obtain observable digital-world data may hire staff to ensure that the various standards, conditions, guidelines, rules, and/or restrictions are met. That is, employees or agents may browse to various digital locations at various times to observe and collect the digital-world data with regard to various content presentation conditions, guidelines, rules, and/or restrictions in order to ensure satisfaction and compliance. Of course, such employees and agents can be expensive in terms of payroll and expenses and due to personalization, it would be hard, if not impossible, to programmatically set all conditions to broadly measure all of the potential experiences that individuals might have. Therefore, organizations often must rely on others to follow the negotiated conditions, guidelines, rules, and restrictions. However, at times, those other actors often have little incentive to go to any great length to ensure that standards or conditions are met or to ensure compliance with applicable guidelines, rules, and/or restrictions. As a result, many businesses are unable to ensure that their standards, conditions, guidelines, rules, and/or restrictions are followed with regularity.

BRIEF DESCRIPTION OF THE DRAWINGS

Embodiments of the subject matter disclosed herein in accordance with the present disclosure will be described with reference to the drawings, in which:

FIG. 3 is a data structure diagram illustrating parameters of an example observation campaign used in conjunction with the system of FIG. 2 according to an embodiment of the subject matter disclosed herein;

Note that the same numbers are used throughout the disclosure and figures to reference like components and features.

DETAILED DESCRIPTION

Figure 1:
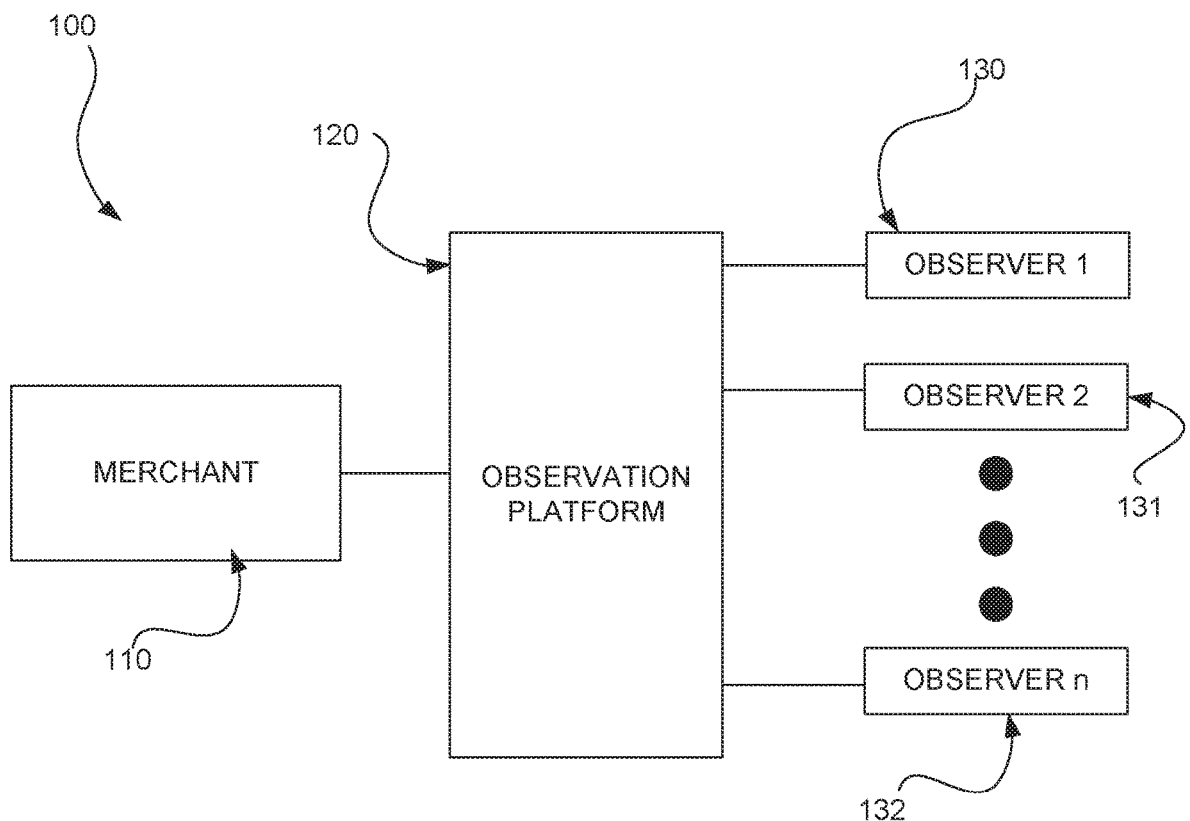
FIG. 1 is a basic block diagram illustrating elements or components of an example system in which an embodiment of the subject matter disclosed herein may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. These systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of an overview, the systems and methods discussed herein may be directed to an observation platform for coordinators, marketers, advertisers, merchants, retailers, and users to establish, utilize and fulfill an observation campaign suited to verify digital-world implementations surrounding observable, standards, objectives, conditions, rules, guidelines, and/or restrictions. The observable data points may be part of an overall strategy in a digital observation campaign established by an observation campaign coordinator. Such a strategy may often involve determining data points like specific user engagement, interest, and exposure via multiple digital properties. A user of this platform, called an observer hereinafter, may use an application downloaded to and executing on a computing device or running in parallel with another application to identify specific observation campaign opportunities. An observation campaign may be a set of verifiable parameters that define specifics about an observation campaign strategy. These verifiable parameters may include specific observable and verifiable digital-world data such as URL location of placement, time-of-day, frequency and the like.

One aspect of this method is determining, with some certainty, that an observed advertisement originated from an advertising campaign. Thus, the advertising observation platform is capable of surveying several media files (e.g., image files, sound files, video files) that are presented as ads within the context of web pages served to browsers of Internet content. As many ads and many media files may look similar, the casual observer may not be able to distinguish content that originated from an observation advertising campaign and a file that did not originate from the advertising campaign. As such, a hashing function may be used on all observed content and all served media files to determine with some certainty that the displayed ad originated from one or more advertising campaigns. Through the hashing function, various presented ads may be parsed for matching with content initially generated with a high degree of certainty. Currents models may be 98% accurate, but this value can vary or be adjusted depending on the match desired. By allowing less than 100% match on the hash, small variations in the content may be captured for observations when otherwise ignored because of small formatting issues and the like. This hashing algorithm is also useful in other areas such as copyright infringement analysis. These and other aspects are described in greater detail below with respect to FIGS. 1-8.

FIG. 1 is a basic block diagram illustrating elements or components of an example system 100 in which an embodiment of the subject matter disclosed herein may be implemented. In the context of FIG. 1 and other figures, a continuing example of a merchant-based observation campaign will be used. Thus, various digital-world data points specific to a merchant that sells goods or services through and/or advertises goods and services on one or more browsable websites or other form of digital data presentation will also be used in context. A skilled artisan understands that the coordinator of an observation campaign need not be a merchant with merchant-specific data points. For example, a coordinator of an observation campaign may be a quality-assurance coordinator seeking to collect data about presentation of observable content. In short, a coordinator of an observation campaign may be any individual, business, government agency, or entity that wishes to incentivize observers to collect digital-world data from myriad locations. However, for ease of illustration and for consistent examples, the remaining disclosure will use the online retail merchant and digital retail platform example without limiting the interpretation or scope of the claims or specification.

As discussed briefly above in an overview, an observation platform 120 provides systems and methods for a merchant 110 to establish and implement an observation campaign for various observers 130, 131, and 132 to collect content presentation data about the observation campaign established by the merchant 110. In this system 100, the merchant block 110, the observation platform block 120 and each observer block 130, 131, and 132 may represent a separate computing device or group of computing devices. Further, the connections between these computing devices may be any communication link, such as the Internet, BlueTooth™ wireless, direct serial link, and the like. The various computing device implementations and embodiments are discussed below.

The observation platform 120 may be embodied in whole or in part as a computing system that includes one or more server computers configured in a cloud-based computing environment. Embodiments may take the form of a hardware implemented embodiment, a software implemented embodiment, or an embodiment combining software and hardware aspects. Further, various computing aspects of the underlying systems and methods may transcend any specific computing entity and the "block" diagram nature of FIG. 1 is intended to illustrate one embodiment. For example, in some embodiments, one or more of the operations, functions, processes, or methods described herein may be implemented by one or more suitable processing elements (such as a processor, microprocessor, CPU, controller, and the like) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. This detailed description is, therefore, not to be taken in a limiting sense.

As alluded to, in some embodiments, the subject matter may be implemented in the context of a "cloud" based computing environment typically used to develop and provide web services and business applications for end users. Further aspects of an exemplary implementation environment will be described with reference to FIGS. 2-6 below. Note that embodiments may also be implemented in the context of other computing or operational environments or systems, such as for an individual business data processing system, a private network used with a plurality of client terminals, a remote or on-site data processing system, another form of client-server architecture, and the like.

The merchant computing device 110 may also be one or more of any number of computing device implementations. In one embodiment, the merchant computing device 110 may be a personal computer or mobile computing device. The merchant computing device 110 may be communicatively coupled to the observation platform 120 through an Internet connection or other communication network. Further, the merchant computing device 110 may be configured to execute a merchant observation application (not shown) that may provide various graphical user interfaces (GUIs) for a merchant to navigate and utilize the observation platform 120, such as, for example, establishing an observation campaign. Various operations and parameters of the merchant computing device 110 are described further below with respect to FIG. 2.

Each observer computing device 130, 131, and 132 may also be one or more of any number of computing device implementations. In one embodiment, each observer computing device 130, 131, and 132 may be a mobile computing device. Each observer computing device 130, 131, and 132 may be communicatively coupled to the observation platform 120 through an Internet connection or other communication network. Further, each observer computing device 130, 131, and 132 may be configured to execute an observer application (not shown) that may provide various GUIs for an observer to navigate and utilize the observation platform 120, such as, for example, fulfilling an opportunity in an observation campaign. Various operations and parameters of the observer computing devices 130, 131, and 132 are also described further below with respect to FIG. 2.

Figure 2:
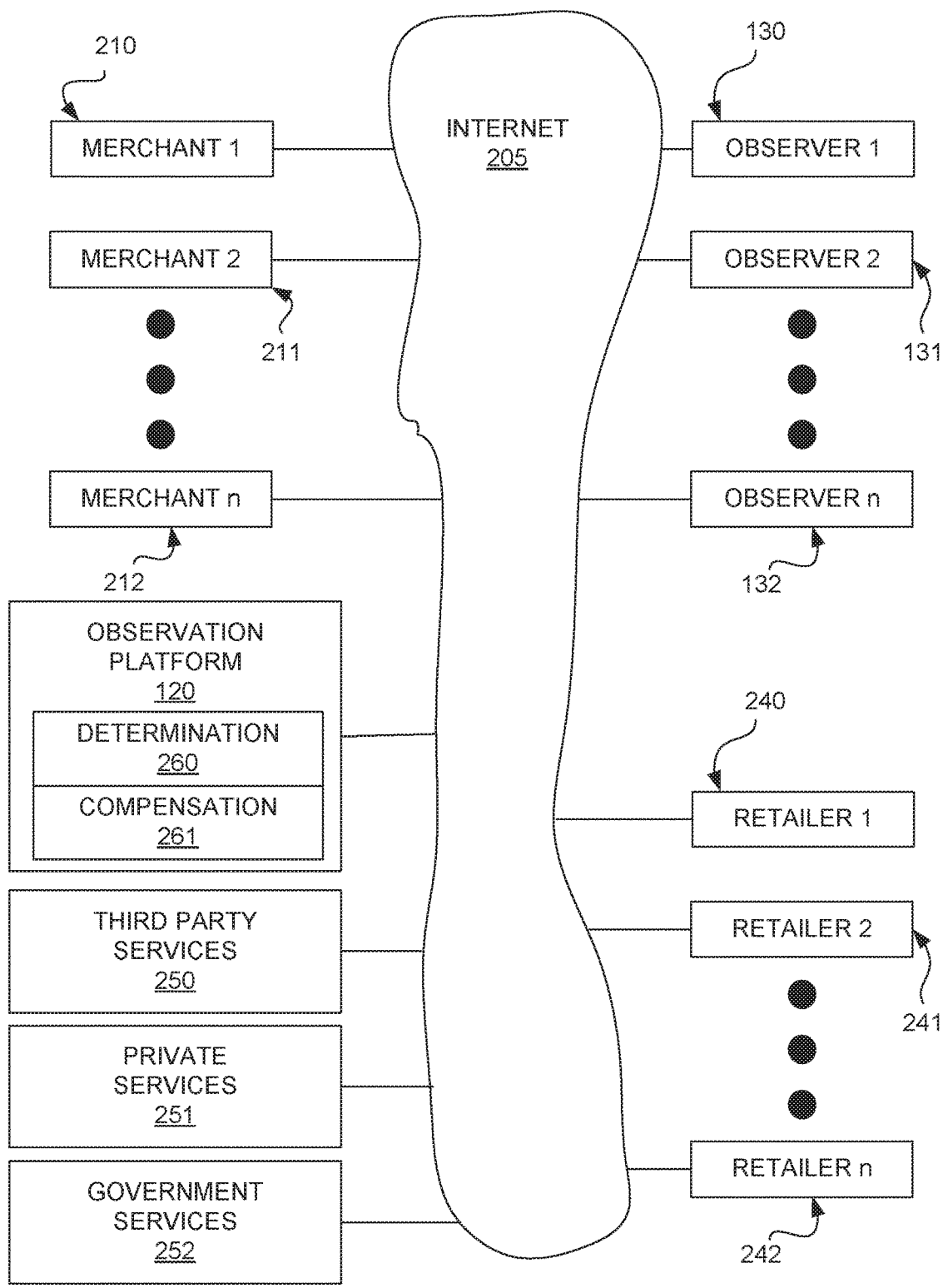
FIG. 2 is a more detailed block diagram of the basic system of FIG. 1 illustrating elements or components of an example system in which an embodiment of the subject matter disclosed herein may be implemented.

FIG. 2 is a more detailed block diagram of the basic system of FIG. 1 illustrating elements or components of an example system 200 in which an embodiment of the subject matter disclosed herein may be implemented. Some elements of FIG. 1 are also shown in FIG. 2 and bear the same reference numerals. In particular, the observation platform 120 may be coupled to computer network 205 such as the Internet, just as observer computing device 130, 132, and 132 are also connected via the network 205. A skilled artisan understands that the designation of observer 1 130 through observer n 132 indicates that any number of merchants may be shown as interfacing with the system 200 (whether such interfacing is discrete or collaborative) In this system 200 embodiment, more than one merchant computing device is shown. Thus, merchant computing devices 210, 211, and 212 may represent different merchants who may individually and independently craft observation campaigns on the observation platform 120 via the network 205. A skilled artisan understands that the designation of merchant 1 210 through merchant n 212 indicates that any number of merchants may be shown as interfacing with the system 200.

Additional computing devices may also be communicatively coupled to the observation platform 120 via the computer network 205. As will be discussed further below, the system 200 may include a number of content provider computing devices 240, 241, and 242. A skilled artisan understands that the designation of content provider 1 240 through content provider n 242 indicates that any number of merchants may be shown as interfacing with the system 200. Further, the system 200 may include computing devices associated with third party services 250, private services 251, and government services 252. Prior to discussing the additional roles for these additional computing devices, the observation platform 120 as well as the observers' and merchants' roles are discussed next.

By way of a general overview of the system in FIG. 2, one embodiment may include a user-based mobile computing device 130 (e.g., a mobile phone, a smart phone, a laptop computer, and handheld computer, a wearable computing device, an augmented reality device, and the like) configured to execute an observation application to coordinate the observing and collecting of real-world or digital-world data. Further, the system may include an observation server computer 120 configured to send notifications that include one or more opportunities for observations of digital-word data to the user-based mobile computing device 130 and configured to receive digital-world data observed and collected by the user-based mobile computing device 130. Further yet, the system may include a merchant-based computing device 210 communicatively coupled to the observation server computer 120 and configured to generate and control a campaign of opportunities sent by the observation server computer 120.

As briefly discussed above, the observation platform 120 may be one or more computing devices configured to work as a server computing entity in a cloud-based computing environment to establish and facilitate observation campaigns for one or more merchants. As used throughout this disclosure, an observation campaign is a set of parameters established by a merchant using one or more inter-related applications operating in the system 200 and coordinated from the observation platform 120. The observation campaign may include a number of parameters designed to encourage various remote users of an observation application (e.g., observers) to collect real-world data about products and goods for sale at various retail locations or digital-world data as it is accessed via browser or similar digital content delivery mechanism.

A merchant that establishes an observation campaign using the observation platform 120 desires to know more about content presentation for goods and products in the marketplace. For example, a merchant may negotiate a deal to have products presented in a specific demographic and may wish to verify that the products are, in fact, presented to web browsers associated with users in a specific demographic. By establishing an observation campaign eliciting this kind of digital-world data, the merchant can incentivize observers (through compensation offered by the observation platform) to fulfill the requirements of the specific digital-world data collection. That is, the merchant may enable an observation campaign through a contract with a proprietor of the observation platform such that the observation platform then offers monetary compensation to one or more observers in exchange for a timely and meaningful collection of digital-world data (e.g., a screen shot or other digital presentation) of the merchant's product for sale at a specific web page or other digital content delivery mechanism As used herein, the term digital-world data may refer to specific observable facts about anything of interest to the coordinator of the campaign that is presented to a user by a digital controller. Digital-world data may be data that can be collected in the digital world.

In this manner, any merchant can use the observation platform to design an observation campaign to incentivize observers to collect very specific kinds of digital-world data at very specific digital, or virtual, locations over very specific time frames. In other aspects, the data collection may be broad and applicable across a wide spectrum. When designing an observation campaign, the merchant may establish observation opportunities based on a desired time frame; for example, a campaign may only have opportunities offered for a one-week time frame or just a few hours in any given day. Further, the merchant may establish observation opportunities based on a desired location such as a specific website or content deliverer and/or for content delivered to in locations in a specific city or within 100 miles of a particular location. Further yet, the merchant may establish observation opportunities based on a desired total number of observations—e.g., a cap of 10 different successful observations. Other campaign parameters are possible and discussed further below with respect to FIG. 3.

As opportunities for observations becomes active (that is, users of the observer application may be offered opportunities via the application) various observers may engage in the various opportunities. Opportunities may be sent as notifications to observers (via a smart phone application, Internet browser, and the like). Such notifications may be influenced by geographic location of various observers (e.g., notifications are only sent to observers proximate to a desired observation retail location or other place of interest). Further, such notification may be influenced by a relative reputation of an observer (e.g., only the "best" observers receive certain opportunities). And, such notifications may be influenced based on demographics and/or past behavior of an observer.

Once an opportunity is received, the observer may accept the opportunity and begin an observation. Some opportunities may have time limits for acceptance of the opportunity and/or time limits for fulfillment of an accepted opportunity. The observation may be simply sending the requested digital-world data to the observation platform 120 for evaluation. The observation platform may include a module for determining 260 whether the received digital-world data from any observer meets the requirements and parameters of an opportunity in an active observation campaign. The determination module 260 may be configured to determine if the received digital-world data from the observer (e.g., sent from user-based mobile computing device) fulfills one or more criteria for data collection in the observation campaign opportunity. Such criteria may include timeliness, image quality, data applicability, data completeness, user demographics, and the like.

If the determination module 260 determines that the received digital-world data from an observer meets the requirements of an observation opportunity, (e.g., the opportunity has been fulfilled), then a compensation module 261 may initiate compensation to the observer for successfully fulfilling an observation campaign opportunity. Such compensation may be financial or non-financial. In one embodiment, the compensation module 261 may communicate with one or more third-party services to credit a bank account associated with the observer(s) that fulfilled the opportunity. Further, the compensation module may also track total financial compensation to specific observers and communicate the said total to government services 252 on an annual or other periodic basis. In other embodiments, the compensation module 261 may communicate with other private services 251, such as social media or online retail, to provide non-financial remuneration to the observer. For example, the observer may qualify for discounts or privileges at third party locations (e.g., food coupons, gift cards, free entry into a sporting event, and the like).

FIG. 3 is a data structure diagram illustrating parameters of an example observation campaign 300 used in conjunction with the system of FIG. 2 according to an embodiment of the subject matter disclosed herein. As discussed above, one or more merchants (210-212 of FIG. 2) may establish and coordinate an observation campaign with several different configurable parameters. FIG. 3 is an illustration of a data structure of one embodiment of an observation campaign 300. It is understood that the parameters shown in FIG. 3 are illustrative and any number of parameters (either greater of fewer than shown in FIG. 3) may be present. These parameters assist in shaping how observers will be incentivized to collect digital world data in response to opportunities presented in the campaign 300. It is also understood that certain identification and demographic parameters (such as merchant name, merchant product, bank data, and the like) may also be established with respect to the merchant. These are not discussed here as the focus of FIG. 3 is on the customizable parameters of an observation campaign 300.

A first parameter in which a merchant may customize an observation campaign 300 is a total cost outlay 310. In this respect, the merchant and the proprietor of the observation platform reach an agreement about the total cost of the observation campaign. The observation platform may then set specific compensation rates for successful observations in order to meet the needs of the established observation campaign. Further, the merchant or the observation platform may choose to designate a maximum (or minimum) amount of financial compensation to be awarded to observers for successfully retrieving digital-world data in fulfillment of an observation opportunity. This may be an aggregated amount on a per campaign basis. For example, a merchant may wish to collect data about as many digital advertising placements as possible until a threshold amount of money has been reached (in terms of financial compensation to all observers in an aggregate manner). This total may also be an aggregate cost outlay for non-financial outlay (e.g., a limit of 10 discount coupons awarded).

In addition to the total cost outlay, the merchant may also configure a parameter associated with a total cost per observation 311. In this manner, the individual observation may be capped at a maximum amount of financial or non-financial compensation. The merchant may also define a minimum cost per observation and can establish a sliding scale for cost per observation according to a number of different variables. For example, the merchant may choose to pay more per observation for the first 10 observations and then drop the cost per observation, or the merchant may choose to pay more per observation based on demographics or past behavior. As another example, the cost per observation may be more during a particular time period, such as late night and then less during a different time period, such as morning. Thus, additional parameters regarding variable cost per transaction 317 may be configured.

The merchant may configure a parameter associated with a total number of observations 312. In this manner, each observation may be counted and once a limit has been reached, the campaign is suspended. The merchant may also define a minimum number of observations needed in order for a campaign to end at a time limit or within a time frame 313. Still further, the merchant may establish a fixed time frame 313 in which the campaign must begin and end. For example, the merchant may choose to establish a time frame of June 1$^{st}$ to June 30$^{th}$ for which a total number of observations is limited to 1000. Once 1000 observations are reached, the campaign may end. Also, the merchant may establish 100 observations as a minimum threshold in which case, the campaign can only end on June 30$^{th}$ if 100 observations are entered.

The merchant may configure a parameter associated with a geographic limitation 314 of the campaign. Several geographic parameters may be established, such as a relative geographic limit of a state, city of country or an absolute geographic limit of within 500 miles of a specific location (city center, for example). There may be additional parameters about limiting the number of observations within geographic regions or limiting the total cost outlay according to geographic region. Further yet, cost per observation may be configured on a per region basis (e.g., paying more for region 1 than region 2).

The merchant may configure a parameter associated with a demographics limitation 322. Several demographic parameters may be established, such as education level, household income, or marital status. There may be additional parameters about limiting the number of observations within demographic groups or limiting the total cost outlay according to demographic groups. Further yet, cost per observation may be configured on a per group basis (e.g., paying more for group 1 than group 2).

The merchant may configure parameters associated with past behaviors limitation 323, sometimes referred to as behavioral analytics. Several behavioral parameters may be established, such as physical movement, website visits, memberships, or shopping patterns. There may be additional parameters about limiting the number of observations within behavioral groups or limiting the total cost outlay according to behavioral groups. Further yet, cost per observation may be configured on a per group basis (e.g., paying more for group 1 than group 2).

The merchant may configure a parameter associated with a diminishing cost per observation 315, choosing to pay more for initial observations when compared to later observations. The parameters may be reversed to pay more for each additional observation after a certain threshold has been reached. Further, the merchant may limit observers who can participate in a campaign to only observers who have reached a specific observer reputation score or ranking 316.

Additional parameters in a campaign may include failure parameters 318 that may suspend a campaign if a threshold of failed observations is entered or the digital-world data collected in initial observations indicates that additional failures will be imminent or predictable. There may be restrictions on the type and quality of images received from observers based on image quality parameters 319. The merchant may establish opportunity lockout parameters 320 for observers who accept an opportunity and then are given two hours of exclusivity to the opportunity to fulfill it. Lastly, in this embodiment, a merchant may define a successful campaign termination parameter 321 so that a campaign may end when a threshold number of successful observations has been reached or a statistically valid number of successful observations is reached. There are additional parameters that may be configured in an observation campaign 300, but are not discussed herein for brevity.

Figure 4:
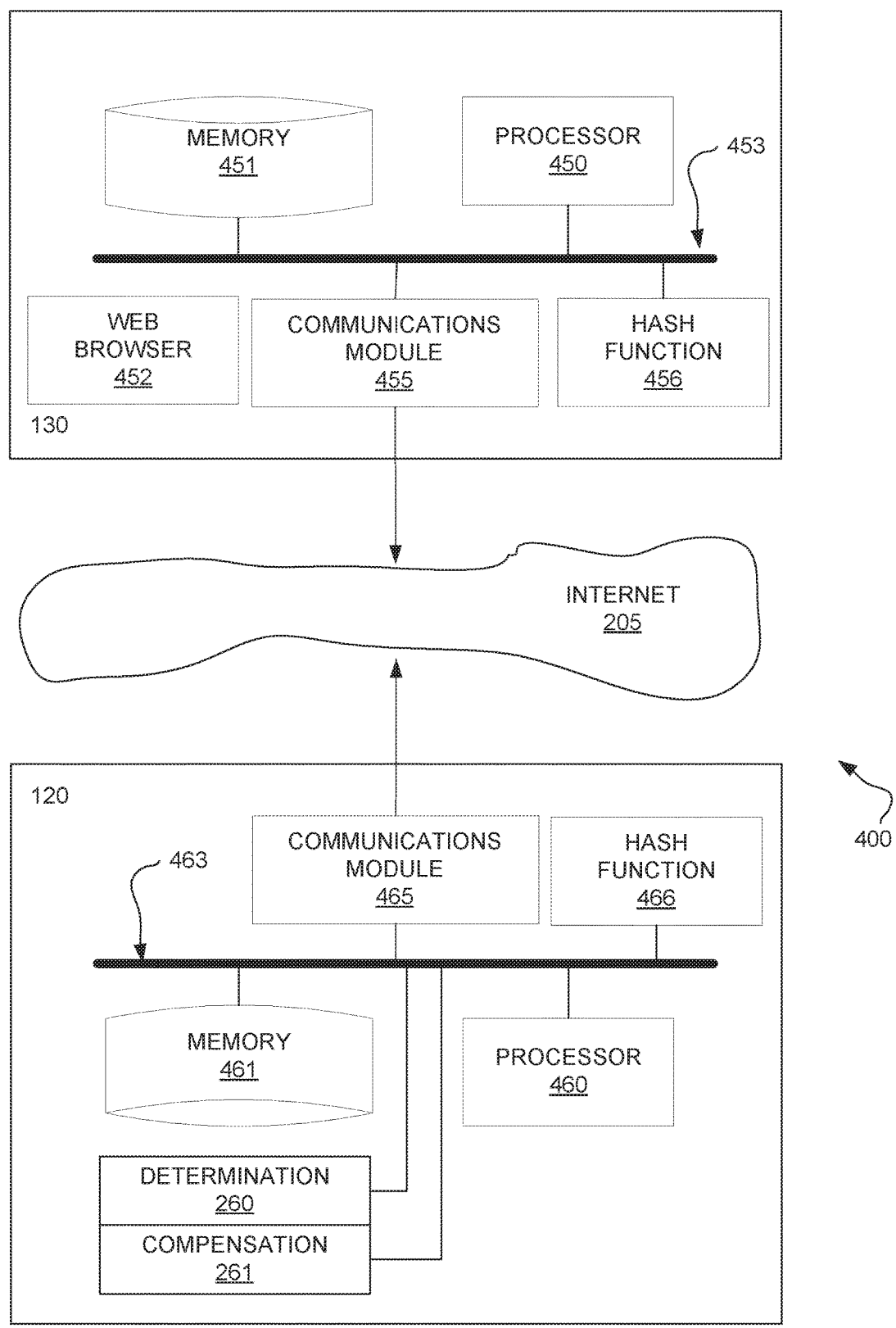
FIG. 4 is a focused block diagram of the system of FIGS. 1-2 illustrating elements or components of an example system in which an embodiment of the subject matter disclosed herein may be implemented.

FIG. 4 is a focused block diagram of the system of FIGS. 1-2 illustrating elements or components of an example system 400 in which an embodiment of the subject matter disclosed herein may be implemented. The focused system 400 features the communicative interactions between an observer computing device 130 and an observation platform server device 120. Each of these devices 120 and 130 may communicate using a computer network such as the Internet 205 via respective communications modules 455 and 465. Further, each device 120 and 130 comprises a respective processor 450 and 460 for executing computer-readable instructions that may be stored using a local memory 451 and 461 and facilitated through a local bus 453 and 463. Further, each device may include a respective hash function module 456 and 466 for executing hash functions as described below. Finally, the observer computing device 130 may further include an application 452 for browsing the web and the observation platform computing device may include additional modules such as a determination engine 260 and a compensation engine 261 as described above.

Using the system 400 of FIG. 4, a computer-based method may be realized using the above-described components. Thus, in one embodiment, the computer-based method may include sending an electronic communication corresponding to an opportunity to observe digitally-presented data at the observer computing device 130, the electronic communication sent to one or more remote computing devices of one or more users from a data observation computing platform 120.

In order to facilitate various follow-on activities, the user of the observer computing device 130 will have registered with the observation platform 120 prior to the observation opportunity being presented. Thus, the one or more users are already registered users of the observation computing platform (e.g., have established a pre-existing relationship with the observation platform as known data gathering entities.

Having such a pre-established relationship as registered users, the user may facilitate a response to observing digitally-presented data to the observation platform through the Internet 205. Thus, as digitally presented data is observed (though web-browsing session or application-based observation such as Facebook or Twitter), a local hash function 456 may parse though every digital data presentation in searching for matches to know observation opportunities. If a match is found, the observer computer may generate a response to the observation platform of a matched digital data presentation along with additional demographic data as discussed below. Alternatively, the observer computer may send image data about all digitally-observed data and a platform based hash function 466 may determine matches. In either case, once a match has been determined, requisite meta data may be sent to the observation platform 120 for determination as to whether the digitally-presented data comports with the tenets and parameters of digital observation campaign using the determination engine 260. If a digital data presentation comports with the digital observation campaign, then a compensation engine may initiate compensation to the user of the observer computing device 130. Likewise, even if the digital data presentation does not comport with the tenets and parameters of the digital observation campaign, the user may still be compensated as the lack of compliance with a digital advertising campaign and/or a digital content observation campaign is still valuable feedback for the administrator of the digital data observation campaign.

Thus, the observation platform 120 receives the response to the electronic initial communication informing the user that an observation opportunity is available, wherein the response includes data corresponding to the observation of the digitally-presented data. As mentioned, the data includes demographic data such as the user's location, time-of-day of the observation, medium of presentation (e.g., web-browsing session, application-based observation (such as Facebook or Twitter) and other personal-identification characteristics that may be deemed part of an observation campaign (e.g., age, gender, ethnicity, religion, preferences, and interaction and buying history). Further, the observation platform 120 determines whether or not the digitally-presented data fulfills the opportunity and, if so, initiates compensation to user corresponding the observer computing device 130 that sent the response. The observation platform 120 assimilates the data from the response into a database 461 of similar data at the observation computing platform.

In order to further facilitate the coordination of observation opportunities the user-based observer computing device 130 may include one of more executing applications for coordinating the opportunity and analyzing digitally presented data. That is, at the observer computing device, a function may be carried out that first identifies digital presentations of data on the remote computing device as being subject to an ongoing observation campaign by hashing the digitally-presented data, comparing the hash of the digitally-presented data to a stored hash of an original digital presentation of the data that would fulfill the opportunity, and if the hashes match, sending the response.

Figure 5:
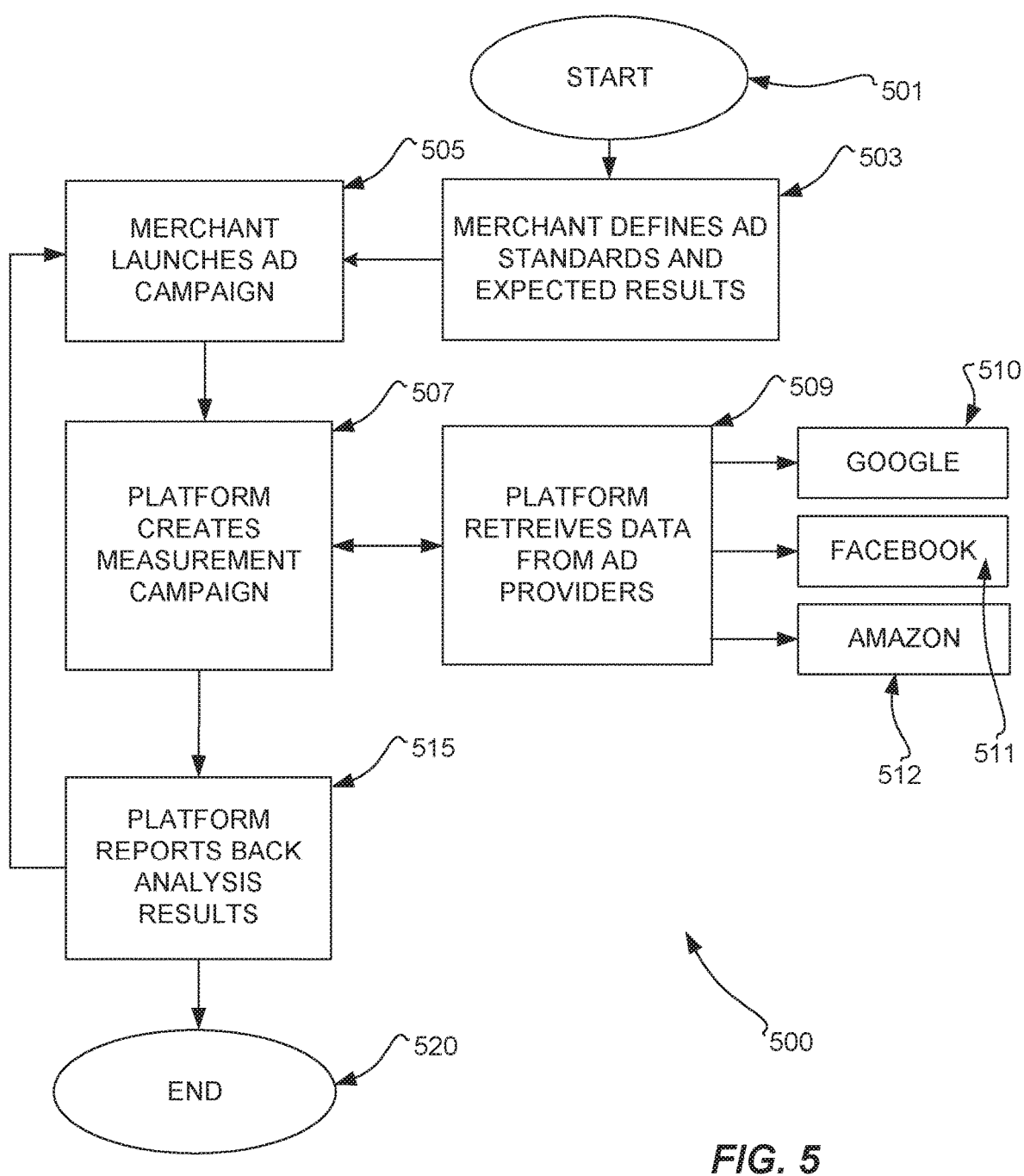
FIG. 5 is a method flow diagram illustrating a method for establishing a digital observation campaign through analysis of collected data using the example system of FIG. 1-4 according to an embodiment of the subject matter disclosed herein.

FIG. 5 is a method flow diagram 500 illustrating a method for establishing an observation campaign through analysis of collected data using the example system of FIG. 2-4 according to an embodiment of the subject matter disclosed herein. In this method, a merchant may first choose to engage the system at a start step 501 creating administering and launching a digital campaign. In establishing the campaign, the merchant may define ad standards and/or other expected results used to influence the nature of the campaign at step 503. These definable ad standards or other expected results may include one or more of the various configurable parameters as discussed above with respect to FIG. 3. The system may then create and administer, at step 507, one or more measurement parameters for ads or other content that may be part of the established digital campaign for determining relative success of the digital campaign as launched. These measurement parameters may be parameters involving time of day of presentation of the ad/content, demographic data about the ad/content viewer, resolution and placement of the ad/content, and frequency of presentation. As these measurement parameters are established, observers may collect digital-world data about ads or other content as displayed in assisting the system with collecting data and fulfilling observation and measurement requirements.

Thus, through the assembled observers willing to participate in observation campaigns, the platform may collect and assemble data to address the measurement parameters as established at step 509. Some examples of sources for retrieving ad or other content presentation include ad/content campaign targets, such as Google™ 510, Facebook™ 511, Amazon™ 512, and the like. As results are collected and organized, these results may be reported to the merchant at step 515 and also used to influence the overall campaign through active feedback as the process may loop back and repeat or end at step 520.

Figure 6:
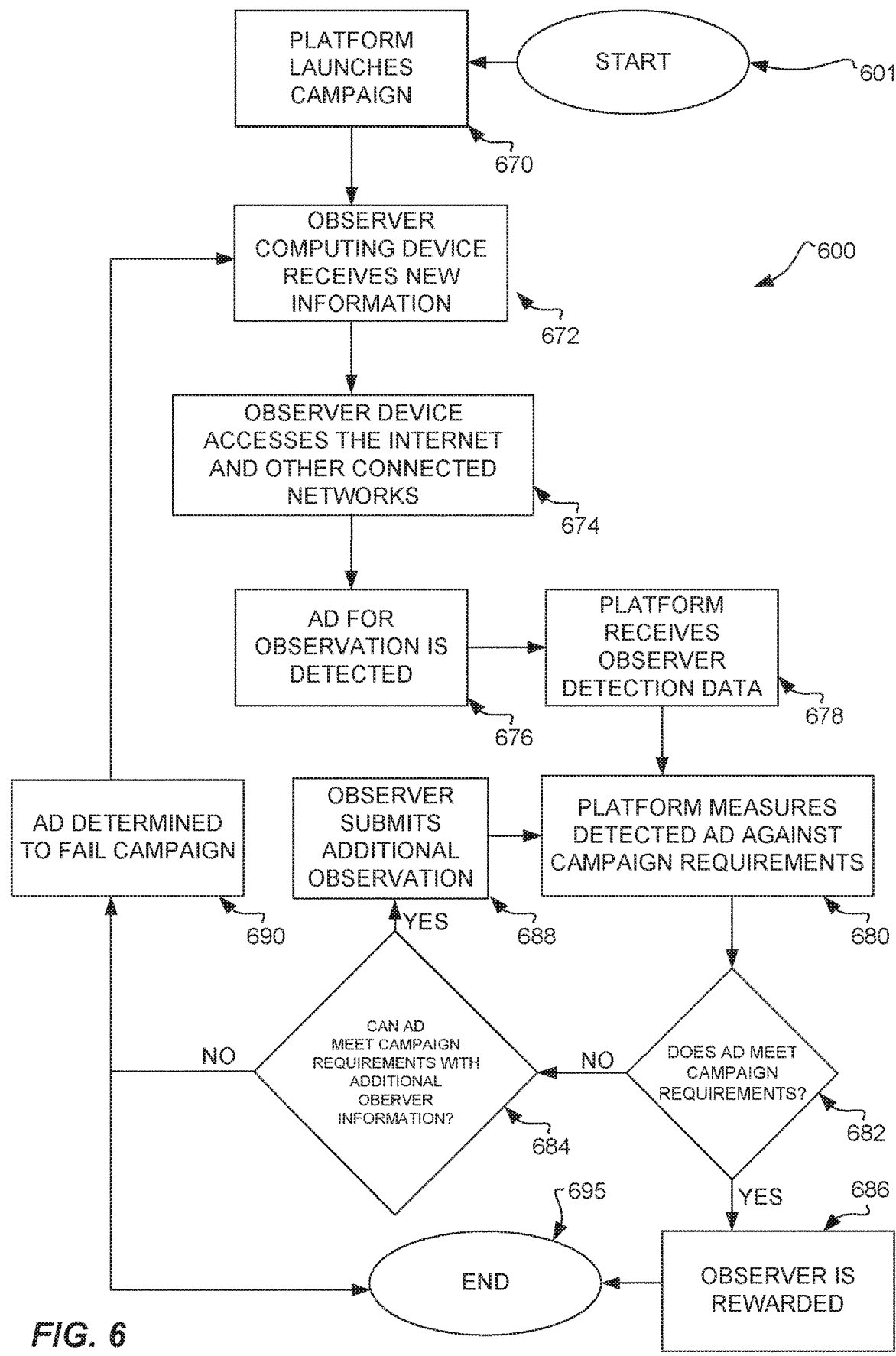
FIG. 6 is a method flow diagram illustrating a method for implementing a digital observation campaign through analysis of collected data using the example system of FIG. 2 according to an embodiment of the subject matter disclosed herein.

FIG. 6 is a method flow diagram 600 illustrating a method for implementing an observation campaign through analysis of collected data using the example system of FIGS. 2-4 according to an embodiment of the subject matter disclosed herein. In initiating this method, a user may start at step 601. In this embodiment, the system may launch a campaign, at step 670 requested by a merchant or user. As the campaign is launched, observers (e.g., users of the observation platform software) receive new information about myriad ad campaigns at step 672. Then, as the observer device browses the internet and various web pages, or browsing or consuming other digital content, software executing on the observer's device may be active and scanning for ads as presented through various websites and other applications at step 674. As content is presented, observations of ads or other content that are part of a directed ad/content campaign are detected at step 676 and analyzed for content, delivery, and quality. This may be accomplished by first detecting an ad/content that is part of an ad/content campaign. As it is detected, additional information is collected about the presentation of the ad/content and sent to the observation system platform at step 678.

The detected and delivered observation data may be compared to baseline data for the ad/content campaign performance parameters and requirements at step 680. A first query step 682 is performed and if the collected data meets the threshold of the ad/content campaign measurement parameter, the observer is deemed to have a successful observance and is compensated at step 686. If the threshold is not met, then additional information may be indicated as needed and communicated to the observer at query step 684. That is, if an opportunity exists to remedy the deficient nature of the collected data (e.g., provision of demographic data about the observer by registering with the platform and/or signing in) then the observer may have a chance to remedy the data at step 688. If there is no remedy, then the collected data is deemed to fail the requirements of the observation campaign at step 690 and the process may revert to a previous step or end at step 695. Thus, the observer can accomplish additional steps to meet the observation threshold and thereby still be compensated.

Figure 7:
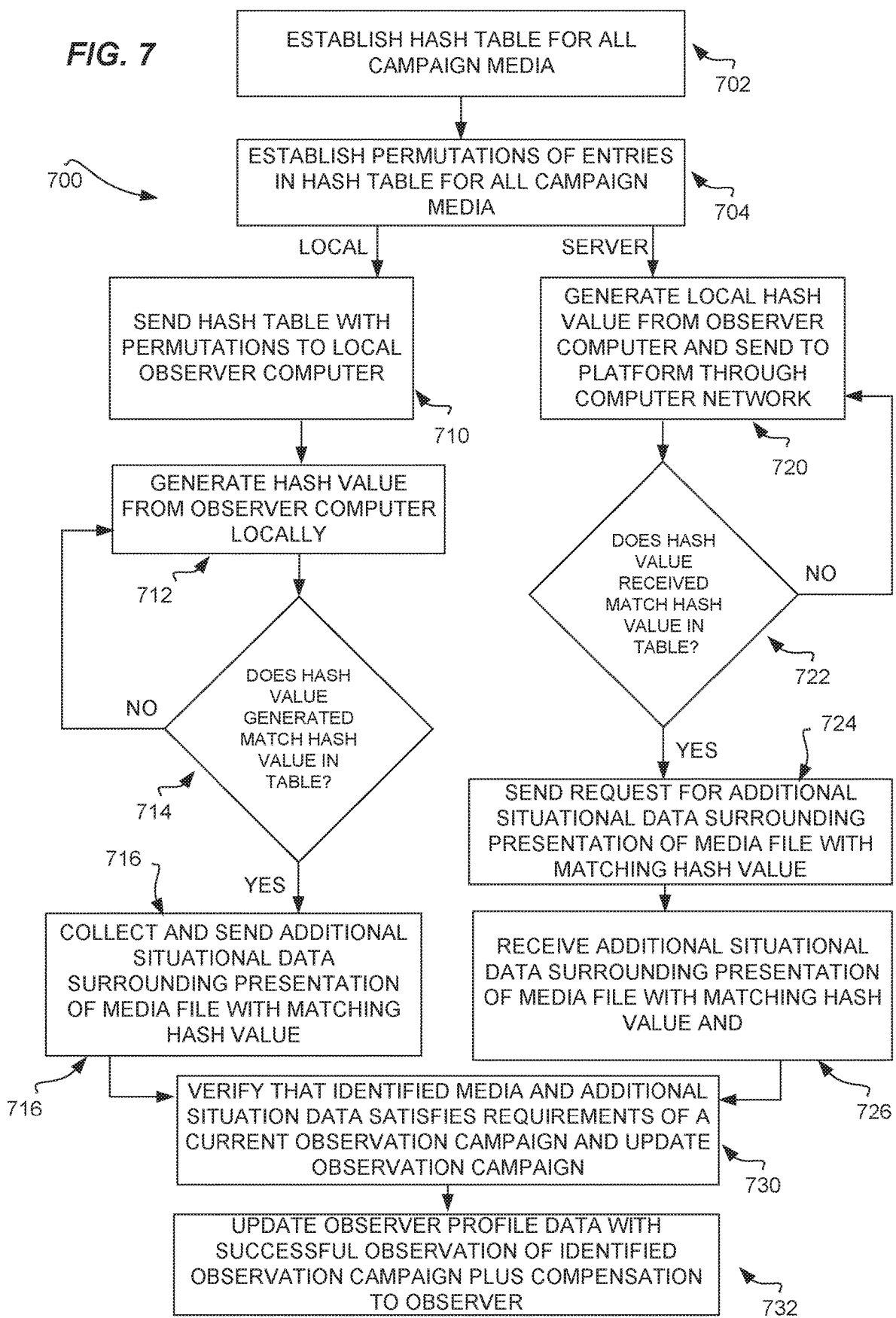
FIG. 7 is a method flow diagram illustrating a method for determining if a presented media file matches one or more of the observation platform media files within one or more observation campaigns.

FIG. 7 is a method flow diagram illustrating a computer-based method 700 for determining if a presented media file matches (e.g., hash function comparison) one or more of the observation platform media files within one or more observation campaigns. In this method 700, an observation campaign may be established as including one or more media files. These media files may be a common digital image file (e.g., JPEG, GIF, TIFF, PDF, and the like), digital sound file (e.g., WAV, MP3, M4A, and the like), or video file (e.g., MPEG, AVI, MOV, and the like). As media files are established as part of an observation campaign, the observation platform may assemble a hash table comprising hash values from a hashing function for each media files included in a given campaign at step 702. Further, simple permutations of the original media file may also be hashed (e.g., small format changes, resolution permutations, file-type changes, and the like) so as to capture minor permutations as still being a "close-enough" version of the original media file. In other embodiments, the permutations may be statistical and/or probabilistic determinations of likely permutations across different digital presentation channels and applications. Thus, in the case of streaming media (e.g., audio and/or video) snippets of the media file may be analyzed and hashed for inclusion in the hash table (e.g., every 10 milliseconds of the file for example, incremented in millisecond intervals). A similar pattern may be realized for images with permutations to pixels included in the hash. These additional permutation hash values along with the original media file hash values may be stored in the observation campaign hash table at step 704.

Next in the method of FIG. 7, two possible paths emerge as the hash table comparisons may be executed at the observer computing device locally or at the observation server platform over a computer network remotely. In a first path (the left-hand side of FIG. 7, the hash table that was created as part of the observation campaign may be transmitted to the local observer computer for use in local media file comparison at step 710.

As an observer views content through browsing the Internet, hash values of all encountered media files may be locally generated at step 712. In a comparison step 714, the latest generated hash value is compared to the hash values in the downloaded hash value table. If there is no match, the method loops back to step 712 for generating a new hash value for the next encountered media file. If the generated hash value does match a hash value in the hash table, then additional data may be collected, assimilated by the local observer computer and sent to the observation platform at step 716. The additional data may include meta data about the media file, such as website in which the media file was presented, time of day of presentation, IP address location, geo-referenced data, demographics data about the observer, time since last display or frequency of display, duration of the display, computer state at time of display, and the like. The observation platform may then process the collected and sent meta data accordingly (as discussed further below).

In a similar manner and as shown generally on the right-side method flow path in FIG. 7, as an observer views content through browsing the Internet, hash values of all encountered media files may be communicated to the observation platform via a computer network at step 720. As the observation platform receive these hash values, a comparison is made to the hash table containing all hash values of the original media files as well as the respective small permutations at the observation platform at query step 722. If the received hash value does not match any hash values in the hash table, the process returns (e.g., the NO branch) to receiving the next hash value form the observer computer.

However, if the received hash value does match one or more of the hash values in the hash table, the observation platform determines (e.g., the YES branch) that the media file is a part of an observation campaign. Thus, additional details about the presentation at the observer computer are requested from the observer computer at step 724. As this detailed information is received at step 726, the observation platform may then process the collected and sent meta data accordingly At step 730 both the local and remote branch convene where the observation platform verifies that the identified media file and the collected meta data satisfies the requirements of the current observation campaign. If verified, the observation platform may then update the observer profile data with a successful observation that may trigger appropriate compensation as well as update the observation campaign in which the media presentation impacts at step 732.

Figure 8:
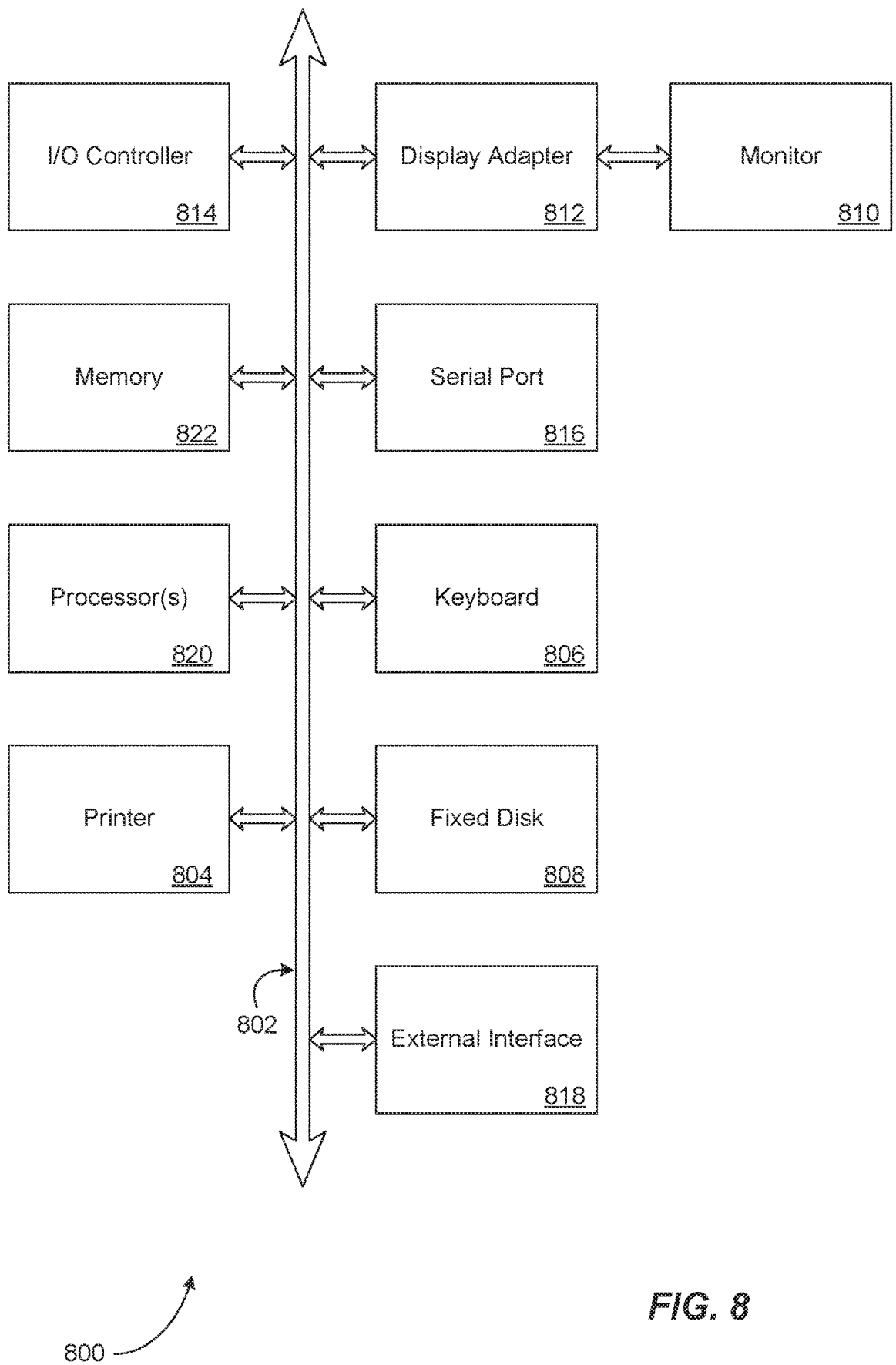
FIG. 8 is a diagram illustrating elements or components that may be present in a computer device or system configured to implement a method, process, function, or operation in accordance with an embodiment.

FIG. 8 and the following discussion are intended to provide a brief, general description of a suitable computing environment in which the subject matter disclosed herein may be implemented. Although not required, aspects of the subject matter disclosed herein will be described in the general context of computer-executable instructions, such as program modules, being executed by a personal computer. Generally, program modules include routines, programs, objects, components, data structures, and the like, that perform particular tasks or implement particular abstract data types. Such program module may be embodied in both a transitory and/or a non-transitory computer readable medium having computer-executable instructions. Moreover, those skilled in the art will appreciate that the invention may be practiced with other computer system configurations, including hand-held devices, cellular or mobile telephones, multiprocessor systems, microprocessor-based or programmable consumer electronics, network PCs, mini-computers, mainframe computers, and the like. The invention may also be practiced in distributed computing environments where tasks are performed by remote processing devices that may be linked through a communications network. In a distributed computing environment, program modules may be located in both local and remote memory storage devices.

FIG. 8 is a diagram illustrating elements or components that may be present in a computer device or system 800 configured to implement a method, process, function, or operation in accordance with an embodiment of the information disclosed herein. It may include the system, apparatus, methods, processes, functions, and/or operations for enabling efficient configuration and presentation of a user interface to a user, based on the user's previous behavior, may be wholly or partially implemented in the form of a set of instructions executed by one or more programmed computer processors, such as a central processing unit (CPU) or microprocessor. Such processors may be incorporated in an apparatus, server, client or other computing or data processing device operated by, or in communication with, other components of the system. FIG. 8 illustrates elements or components that may be present in a computer device or system 800 configured to implement a method, process, function, or operation in accordance with an embodiment. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to additional devices and/or systems not shown in FIG. 8, including a wide area network (such as the Internet), a mouse input device, and/or a scanner. The interconnection via the system bus 802 allows one or more processors 820 to: communicate with each subsystem, control the execution of instructions that may be stored in a system memory 822 and/or the fixed disk 808, and to exchange information between subsystems. The system memory 822 and/or the fixed disk 808 may represent any tangible computer-readable medium.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

The system may use a bus 802 that can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The systems and methods herein enable rapid ingestion of big data sets in a distributed computing environment. The metadata driven approach intake processing reduces source ingestion time, enhances reliability, and automates data intake. Furthermore, the platform agnostic nature of the present disclosure can operate on an input source in any electronic format. The error logging and reporting of the present disclosure further enable users to monitor progress and identify bad data based on predetermined or dynamically generated validation tolerances.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g., data, information, metadata, and the like), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, and the like), an "eBook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, and the like) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular 30 link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, and the like, may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®, JAVASCRIPT, active server pages (ASP) common gateway interface scripts (CGI), extensible markup language (XML), dynamic HTML, cascading style sheets (CSS), AJAX (Asynchronous JAVASCRIPT and XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of process flow and the descriptions thereof may make reference to user WINDOWS®, webpages, websites, web forms, prompts, and the like. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Systems, methods and computer program products are provided. In the detailed description herein, references to "various embodiments", "one embodiment", "an embodiment", "an example embodiment", and the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to cat least one of A, B, and C' or cat least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

Since many modifications, variations, and changes in detail can be made to the described preferred embodiments of the subject matter, it is intended that all matters in the foregoing description and shown in the accompanying drawings be interpreted as illustrative and not in a limiting sense. Thus, the scope of the subject matter should be determined by the appended claims and their legal equivalence.

That which is claimed is:

1. A computer-based method, comprising:
   at a local observer computer executing an observance opportunity application that is associated with one or more users of a data observation computing platform executing an observance opportunity platform, receiving digitally-presented data in one or more media files;
   rendering each media file on a display and performing a hash function on each rendered media file to generate a respective hash value corresponding to each rendered media file;
   comparing, at the local observer computer, each generated hash value to a table of previously-generated hash values about media files that are part of an observation campaign; and
   in response to determining that any generated hash value matches at least one of the previously-generated hash values in the hash table, collecting and sending meta data about the matching media file and meta data about the local observer computer to a remote server computer.

2. The computer-based method of claim 1, wherein comparing the generated hash value to a table of previously-generated hash values further comprises executing the comparison at the local observer computer wherein the hash table is stored in a local data store at the local observer computer.

3. The computer-based method of claim 1, further comprising executing a second comparison at the remote server computer wherein a second hash table is stored in a remote data store at the remote server computer and the local observer computer is configured to send the generated hash value to the remote server computer through a communicatively-coupled computer network.

4. The computer-based method of claim 1, further comprising registering the local observer computer with the remote server computer as part of the observation campaign prior to rendering the media file at the local observer computer.

5. The computer-based method of claim 1, wherein the previously generated hash values in the hash table comprise a plurality of permutations of the original media file that is rendered at the local observer computer.

6. The computer-based method of claim 1, further comprising initiating compensation to a user of the local observer computer in response to receiving the meta data at the remote server computer.

7. The computer-based method of claim 1, wherein the media file is rendered by a web-browser application executing at the local observer computer during web-browsing session.

8. The computer-based method of claim 1, wherein the media file is rendered by an application executing on the local observer computer.

9. The computer-based method of claim 1, wherein the meta data about the media file comprises one or more of the group consisting of: a time-of-day of rendering, a duration of the rendering, an interruption in the rendering, a resolution of the rendering, a bit-rate of the rendering, a computer state during the rendering, a duration since last rendering of the media file, and a history previously rendered media files near the same time frame as the rendering of the media file.

10. The computer-based method of claim 1, wherein the meta data about the user of the local observer computer comprises one or more of the group consisting of: an age of the user, a location of the user, a gender of the user, an ethnicity of the user, an economic factor about the user, an education level of the user, a web search history associated with the user, a marital status of the user, and a frequency of an application use of the user.

11. A computer system, comprising:
a local observer computer configured to execute an observance opportunity application associated with one or more users of a data observation computing platform executing an observance opportunity platform, and configured to render a media file on a display and configured to perform a hash function on the rendered media file to generate a hash value corresponding to the rendered media file; and
a remote server computer configured to receive a communication from the local observer computer with the generated hash value; and
wherein the local observer computer is further configured to
determine whether the generated hash value matches one or more of a plurality of hash values stored in a local hash table; and
in response to determining that the generated hash value matches at least one of the previously-generated hash values in the hash table, collecting and sending meta data about the media file from the local observer computer and meta data about the local observer computer from the local observer computer.

12. The computer system of claim 11, wherein the local observer computer is registered with the remote server computer as part of the observation campaign prior to rendering the media file at the local observer computer.

13. The computer system of claim 11, wherein the previously generated hash values in the hash table comprise a plurality of permutations of the original media file that is rendered at the local observer computer.

14. The computer system of claim 11, wherein the remote server computer is further configured to initiate compensation to a user of the local observer computer in response to receiving the meta data at the remote server computer.

15. The computer system of claim 11, wherein the media file is rendered by a web-browser application executing at the local observer computer during web-browsing session.

16. The computer system of claim 11, wherein the meta data about the media file comprises one or more of the group consisting of: a time-of-day of rendering, a duration of the rendering, an interruption in the rendering, a resolution of the rendering, a bit-rate of the rendering, a computer state during the rendering, a duration since last rendering of the media file, and a history previously rendered media files near the same time frame as the rendering of the media file.

17. The computer system of claim 11, wherein the meta data about the user of the local observer computer comprises one or more of the group consisting of: an age of the user, a location of the user, a gender of the user, an ethnicity of the user, an economic factor about the user, an education level of the user, a web search history associated with the user, a marital status of the user, and a frequency of an application use of the user.

18. A computing device, comprising:
a processor;
a memory coupled to the processor;
a communication module configured to communicate with a computer network; and
a display coupled to the processor and configured to render media files on the display under control of the processor;
wherein the processor is further configured to:
execute an observance opportunity application associated with one or more users of a data observation computing platform executing an observance opportunity platform,
render at least one media file on a display;
execute a hash function to generate a hash value for each rendered media file;
compare, at the computing device, each generated hash value to a hash table of previously generated hash values associated with one or more media files that are part of an observation campaign;
in response to a match of the generated hash value to at least one hash value in the table of hash values, collecting meta data about the rendered media file and collecting meta data about the computing device; and
sending all collected meta data to a remote server computer associated with the observation campaign.

19. The computing device of claim 18, wherein the meta data about the media file comprises one or more of the group consisting of: a time-of-day of rendering, a duration of the rendering, an interruption in the rendering, a resolution of the rendering, a bit-rate of the rendering, a computer state during the rendering, a duration since last rendering of the media file, and a history previously rendered media files near the same time frame as the rendering of the media file.

20. The computing device of claim 18, wherein the meta data about the computing device comprises one or more of the group consisting of: an age of the user, a location of the user, a gender of the user, an ethnicity of the user, an economic factor about the user, an education level of the user, a web search history associated with the user, a marital status of the user, and a frequency of an application use of the user.

21. The computing device of claim 18, further comprising a computing device in the group consisting of: a smart phone, a desktop computer, a laptop computer, a tablet computer, and wearable device computer.

* * * * *